United States Patent Office 3,341,295
Patented Sept. 12, 1967

3,341,295
THIONYLTETRAFLUORIDE
Richard E. Eibeck, Morristown, N.J., and Abe F. Maxwell, Durham, N.C., assignors to Allied Chemical Corporation, New York, N.Y., a corporation of New York
No Drawing. Filed May 18, 1964, Ser. No. 368,339
4 Claims. (Cl. 23—203)

This invention relates to thionyltetrafluoride and more particularly to a new and improved method for the manufacture of thionyltetrafluoride.

Thionyltetrafluoride is a known compound having a boiling point of about −49° C. The compound thionyltetrafluoride is useful as an intermediate for the preparation of fluosulfonates. Products of its reaction with ammonia polymerize to give high molecular weight sulfur-fluorine-nitrogen-oxygen polymers which are quite chemically and physically inert.

It has been proposed to make thionyltetrafluoride by reaction of thionylfluoride and fluorine over a platinum or silver fluoride catalyst. Another procedure for the preparation of thionyltetrafluoride involves reaction of sulfur tetrafluoride and oxygen in the presence of nitrites and nitrates. Such procedures, however, are not entirely satisfactory for commercial operation because the raw materials are costly and the processes involved are time consuming. Moreover, there are by-products produced from which it is most difficult to separate a pure thionyltetrafluoride product in high yield.

An object of the invention lies in the provision of a process for making thionyltetrafluoride by a simple and economical procedure with the aid of low-cost, readily available starting materials. Another object of the invention is to produce thionyltetrafluoride in high yield with a high degree of purity. Other objects and advantages will be apparent from the following detailed description.

In accordance with the invention, it has been found that thionyltetrafluoride may be made in a gas-phase operation using elemental fluorine as a fluorinating agent by contacting gaseous sulfur dioxide with elemental fluorine at a temperature above 1000° C. to convert the sulfur dioxide and fluorine to thionyltetrafluoride.

Generally, practice of the invention includes subjecting gas-phase sulfur dioxide to the action of gaseous fluorine at substantially atmospheric pressure and at the flame temperature of sulfur dioxide and fluorine in quantity and for a time sufficient to fluorinate a substantial mass of the sulfur dioxide starting material to form a substantial amount of the thionyltetrafluoride product and recovering the latter from the resulting reaction products. More particularly, gaseous sulfur dioxide and gaseous elemental fluorine are continuously metered, mixed and fed into a suitable reactor where they are contacted and reacted with the emission of visible light to form thionyltetrafluoride at the flame temperature of the reactants. Reactions involved in practice of the invention may be represented by

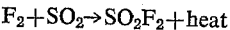
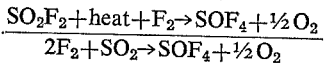

$$F_2 + SO_2 \rightarrow SO_2F_2 + \text{heat}$$
$$\underline{SO_2F_2 + \text{heat} + F_2 \rightarrow SOF_4 + \tfrac{1}{2}O_2}$$
$$2F_2 + SO_2 \rightarrow SOF_4 + \tfrac{1}{2}O_2$$

Product recovery may be effected by procedures conventional in this art. For example, products exiting from the reaction zone may be passed into a fractionating column where the thionyltetrafluoride is fractionally distilled from the other reaction products.

The reactor employed may be any suitable reactor which is equipped to separately introduce the sulfur dioxide and fluorine gas reactants for contact in a reaction zone and having provisions for discharging the reactant products therefrom. The reactor is desirably fabricated from material which does not react with the reactants or reaction products. Suitable materials include Monel and nickel. A particularly suitable type reactor is a T-shaped reactor consisting of a Monel T to which have been attached, nickel and copper cylindrical inlet tubes for the introduction of the sulfur dioxide and fluorine gas respectively which enter the inlet tubes through gas metering devices such as gas flow meters. The initial contacting of the fluorine and sulfur dioxide in theoretical amounts may cause some operating difficulties such as small explosions in the system. To eliminate this undesirable effect, the fluorine gas may be introduced through the flow meter into the system in contact with an inert gas such as helium which is introduced through the inlet provided for the introduction of sulfur dioxide. Thereafter, the helium flow is decreased and the sulfur dioxide gradually introduced with the helium while keeping the gas flow rate at the same reading on the metering device until the sulfur dioxide required for the reaction replaces all the helium which was flowing in the system. Alternatively and more preferably, a smooth reaction takes place without the need for any inert gas through the system by preheating the reactor prior to the introduction of the reactants. This may be accomplished by passing a hot air blast through the system at a temperature and for a sufficient length of time such that the reactor is heated to a temperature of about 220 to 270° C.

With regard to mole ratio of fluorine to sulfur dioxide, theoretical requirements are approximately two moles of fluorine to one mole of sulfur dioxide. Less than theoretical quantities of fluorine may be employed say a molar ratio of 1 to 1, but in that case, there is an increase in the by-products produced. Higher proportions of fluorine, that is, more than two moles of fluorine per mole of sulfur dioxide may be employed, however, larger amounts of an excess of three moles of fluorine tend to dilute the heating effect in the reaction zone reducing the thionyltetrafluoride yield. An amount of less than one mole of fluorine per mole of sulfur dioxide does not give as satisfactory results. For best results, however, it is preferred to employ 1.5 to 2.5 moles of fluorine per mole of sulfur dioxide.

The temperature at which the reaction occurs is at the flame temperature of the reactants. While it is difficult to actually determine the exact flame temperature, it is known that this temperature is in excess of 1000° C. Good conditions of flame temperature can be readily ascertain without knowledge of its numerical value by emission of visible light from the reaction of sulfur dioxide and elemental fluorine.

Although the process can be operated at sub-atmospheric or super-atmospheric pressures, an important advantage of this operation is that the process can be conducted at substantially atmospheric pressure i.e., a pressure from atmospheric pressure to 15 p.s.i.g.

The reaction between fluorine and sulfur dioxide is almost instantaneous with the emission of visible light. However, the contact time may be varied considerably without noticeable disadvantage. Generally, increasing contact time and reacting temperature results in higher reactivity. Significant conversions are effected at contact times as short as one second, and contact time may be as high as 30 seconds.

The following examples illustrate practice of the invention.

EXAMPLE 1

In this example, a T-shaped reactor was employed which consisted of a Monel T to which has been connected nickel and copper inlet tubes. A flow meter was connected to each inlet tube to regulate the amount of reactants entering the reactor. Fluorine flowing at the rate of 200 cc./minute was passed through the system to pacify any fresh surfaces and after about 15 minutes, helium was then allowed to flow into the system through the second flow meter at a rate corresponding to a flow of 100 cc./minute of sulfur dioxide. Through the same flow meter sulfur dioxide was then gradually added to the helium system while the helium flow was decreased, however, the flow meter indicator was kept at the same level. When helium was no longer flowing, a smooth reaction occurred between the fluorine gas and sulfur dioxide. A sample of the product gases were subjected to standard vacuum line fractionation and there was separated from the system, sulfuryl fluoride ($SO_2F_2$) sulfur hexafluoride, $SF_6$ and thionyltetrafluoride $SOF_4$ as products of the reaction. The thionyltetrafluoride was obtained in approximately 50% yield.

EXAMPLE 2

Using the apparatus of Example 1, the procedure was repeated except that the fluorine entered the reactor at 200 cc./minute and the T was preheated to about 250° C. by a hot air blast. When sulfur dioxide was added to the system, a smooth reaction was obtained and the product thionyltetrafluoride was recovered for a 50% yield.

EXAMPLE 3

The procedure of Example 1 was repeated except that the flow of fluorine was increased to 300 cc./minute and the sulfur dioxide entered at a flow rate of 150 cc./minute. Under these conditions a 68% yield of thionyltetrafluoride was obtained.

Although certain preferred embodiments of the invention have been disclosed for purpose of illustration, it will be evident that various changes and modifications may be made therein without departing from the scope and spirit of the invention.

We claim:
1. A process for producing thionyltetrafluoride from sulfur dioxide and elemental fluorine which comprises contacting gaseous sulfur dioxide with elemental fluorine at a temperature above 1000° C. to convert the sulfur dioxide and fluorine into thionyltetrafluoride.

2. A process for producing thionyltetrafluoride from sulfur dioxide and elemental fluorine which comprises contacting gaseous sulfur dioxide with elemental fluorine at the flame temperature of sulfur dioxide and elemental fluorine to convert the sulfur dioxide and fluorine into thionyltetrafluoride.

3. The process of claim 2 in which the mole ratio of fluorine to sulfur dioxide is substantially in the range of 1:1 to 3:1.

4. A process for producing thionyltetrafluoride from sulfur dioxide and elemental fluorine which comprises contacting gaseous sulfur dioxide with elemental fluorine at the flame temperature of sulfur dioxide and elemental fluorine and a mole ratio of fluorine to sulfur dioxide substantially in the range of 1.5 to 2.5 to convert the sulfur dioxide and fluorine into thionyltetrafluoride.

References Cited

Jonas: Angew. Chem. 61, 32 (1949).
Miller et al.: Ind. Eng. Chem. 42, 2223–7 (1950).
Dudley et al.: J. Am. Chem. Soc. 78, 1553–7 (1956).

OSCAR R. VERTIZ, *Primary Examiner.*

H. S. MILLER, *Assistant Examiner.*